United States Patent
Hall

(10) Patent No.: US 9,210,417 B2
(45) Date of Patent: Dec. 8, 2015

(54) REAL-TIME REGISTRATION OF A STEREO DEPTH CAMERA ARRAY

(71) Applicant: MICROSOFT TECHNOLOGY LICENSING, LLC, Redmond, WA (US)

(72) Inventor: Michael Hall, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 46 days.

(21) Appl. No.: 13/944,498

(22) Filed: Jul. 17, 2013

(65) Prior Publication Data

US 2015/0022669 A1  Jan. 22, 2015

(51) Int. Cl.
| | |
|---|---|
| *G06K 9/32* | (2006.01) |
| *H04N 17/00* | (2006.01) |
| *G06T 7/00* | (2006.01) |
| *H04N 5/247* | (2006.01) |
| *H04N 13/02* | (2006.01) |

(52) U.S. Cl.
CPC ............ *H04N 17/002* (2013.01); *G06T 7/0018* (2013.01); *G06T 7/0024* (2013.01); *H04N 5/247* (2013.01); *H04N 13/0242* (2013.01); *H04N 13/0246* (2013.01)

(58) Field of Classification Search
CPC .................. G06T 7/0018; G06T 7/002; G06T 7/0024–7/0028; H04N 5/247; H04N 17/002; H04N 13/0242; H04N 13/0246
USPC ........................................................ 382/294
See application file for complete search history.

(56) References Cited

U.S. PATENT DOCUMENTS

| | | |
|---|---|---|
| 6,795,590 B1 * | 9/2004 | Chen .............................. 382/294 |
| 7,307,655 B1 * | 12/2007 | Okamoto et al. ........... 348/222.1 |
| 8,401,242 B2 | 3/2013 | Newcombe et al. |

(Continued)

FOREIGN PATENT DOCUMENTS

EP  2141932 A1  1/2010

OTHER PUBLICATIONS

"International Search Report & Written Opinion for PCT Application No. PCT/US2014/046583", Mailed Date: Oct. 30, 2014, 8 Pages.

(Continued)

*Primary Examiner* — Yubin Hung
(74) *Attorney, Agent, or Firm* — Gregg Wisdom; Judy Yee; Micky Minhas

(57) ABSTRACT

Real-time registration of a camera array in an image capture device may be implemented in the field by adjusting a selected subset of independent parameters in a mapping function, termed registration coefficients, which have been determined to have the largest contribution to registration errors so that the array can be maintained in its initial factory-optimized calibrated state. By having to adjust only a relatively small subset of registration coefficients from within a larger set of coefficients (which are typically determined using a specialized calibration target in a factory setting), far fewer matching patterns need to be identified in respective images captured by cameras in the array in order to correct for registration errors. Such simplified pattern matching may be performed using images that are captured during normal camera array usage so that registration may be performed in real-time in the field without the need for specialized calibration targets.

17 Claims, 17 Drawing Sheets

(56) References Cited

U.S. PATENT DOCUMENTS

| | | | |
|---|---|---|---|
| 8,401,276 | B1 | 3/2013 | Choe et al. |
| 2003/0090577 | A1* | 5/2003 | Shirakawa ................. 348/222.1 |
| 2004/0091171 | A1* | 5/2004 | Bone ............................. 382/284 |
| 2005/0117034 | A1* | 6/2005 | Cutler .......................... 348/239 |
| 2007/0122014 | A1 | 5/2007 | Sato |
| 2008/0199078 | A1* | 8/2008 | Lam et al. .................... 382/190 |
| 2009/0285361 | A1* | 11/2009 | Akahori .................... 378/98.11 |
| 2011/0122308 | A1 | 5/2011 | Duparre |
| 2011/0317005 | A1 | 12/2011 | Atkinson |
| 2011/0317906 | A1* | 12/2011 | Wallack et al. ............... 382/141 |
| 2012/0050488 | A1 | 3/2012 | Cohen et al. |
| 2012/0148145 | A1* | 6/2012 | Liu et al. ...................... 382/154 |
| 2012/0169842 | A1 | 7/2012 | Chuang et al. |
| 2012/0194517 | A1 | 8/2012 | Izadi et al. |
| 2012/0229628 | A1 | 9/2012 | Ishiyama et al. |
| 2013/0208081 | A1* | 8/2013 | Xiong et al. ..................... 348/36 |
| 2013/0251218 | A1* | 9/2013 | Eriksson Jarliden ......... 382/128 |
| 2013/0259131 | A1* | 10/2013 | Kondo .................... 375/240.16 |
| 2014/0313347 | A1* | 10/2014 | Wu et al. ....................... 348/187 |

OTHER PUBLICATIONS

Gheta, et al., "3D Fusion of Stereo and Spectral Series Acquired With Camera Arrays", Retrieved at <<http://cdn.intechopen.com/pdfs/15842/InTech-3d_fusion_of_stereo_and_spectral_series_acquired_with_camera_arrays.pdf>> Retrieved Date: Apr. 11, 2013, pp. 73-92 (21 pages total).

"Microsoft Live Labs Introduces Photosynth, a Breakthrough Visual Medium", Retrieved at <<http://www.microsoft.com/en-us/news/press/2008/aug08/08-20Photosynth08PR.aspx>> Aug. 20, 2008, Retrieved Date: Apr. 11, 2013, pp. 1-3 (3 pages total).

Dang, et al., "Continuous Stereo Self-Calibration by Camera Parameter Tracking", Retrieved at <<http://www.mrt.kit.edu/z/publ/download/dangStillerHoffmannTIP09.pdf>> In IEEE Transactions on Image Processing, vol. 18, Issue 7, Jul. 2009, Retrieved Date: Apr. 11, 2013, pp. 1536-1550 (15 pages total).

"Calibration and Registration of Camera Arrays Using a Single Circular Grid Optical Target", U.S. Appl. No. 13/715,723, filed Dec. 14, 2012 (59 pages total, including specification and drawings).

"Written Opinion Issued in PCT Patent Application No. PCT/US2014/046563", Mailed Date: Jun. 22, 2015, (5 pages total).

* cited by examiner

FIG 11

$$x_{px,B} = \underbrace{\left(\frac{s_{px,A}}{s_{px,B}}\right)\left(\frac{f_B}{f_A}\right)}_{\text{Scale Factor}}\left[(x_{px,A}-\overbrace{\Delta_{x,A}}^{\substack{\text{Principal}\\\text{Point}\\\text{(IR)}}}) - \overbrace{\left(\frac{f_A}{s_{px,A}}\right)\left(\frac{d}{z}\right)}^{\text{Parallax}}\right] + \overbrace{\Delta_{x,B}}^{\substack{\text{Principal}\\\text{Point}\\\text{(RGB)}}}$$

1100

$$y_{px,B} = \underbrace{\left(\frac{s_{px,A}}{s_{px,B}}\right)\left(\frac{f_B}{f_A}\right)}_{\text{Scale Factor}}(y_{px,A}-\underbrace{\Delta_{y,A}}_{\substack{\text{Principal}\\\text{Point}\\\text{(IR)}}}) + \underbrace{\Delta_{y,B}}_{\substack{\text{Principal}\\\text{Point}\\\text{(RGB)}}}$$

$$x_{px,B} = \alpha_x x_{px,A} + \Delta_x \qquad 1200$$

$$y_{px,B} = \alpha_y y_{px,A} + \Delta_y \qquad 1205$$

FIG 13

$$\Delta x_{i,B} = \frac{1}{s_{px,B}}\left(\frac{df_B}{z_o\left(1+\frac{z_o}{\Delta z}\right)}\right)$$

1300

1400

Camera A (1405)    Camera B (1410)

$$x_{i,B} = (f_B + df_B)\tan\left[\tan^{-1}\left[\frac{(z_A + dz_A)\tan\left[\tan^{-1}\left[\frac{(x_{i,A} - \Delta_{x,A})}{(f_A + df_A)}\right] + \delta_A\right] + (D + dD)}{(z_B + dz_B)}\right] - \delta_B\right] + \Delta_{x,B}$$

1500

$$\bar{X}_{RGB} = \sum_{n=0}^{7}\sum_{m=0}^{6} c_{nm} x_i^n y_i^m \quad 1605$$

$$\bar{Y}_{RGB} = \sum_{n=0}^{7}\sum_{m=0}^{6} c_{nm} x_i^n y_i^m \quad 1610$$

US 9,210,417 B2

REAL-TIME REGISTRATION OF A STEREO DEPTH CAMERA ARRAY

BACKGROUND

Image registration ("registration") is a process by which real world features captured from different perspectives via images from two or more cameras are matched so that information about the real world may be aggregated. Typical examples include combining RGB (Red, Green, Blue) images from two standard cameras to produce a three dimensional (3D) depth image, and combining depth data from one camera with color data from another camera. Registration is typically technically challenging and implementations can be computationally intensive and time consuming which often make them appropriate only for initial calibration of cameras in a factory setting.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Real-time registration of a camera array in an image capture device may be implemented in the field by adjusting a selected subset of independent parameters in a mapping function, termed registration coefficients, which have been determined to have the largest contribution to registration errors so that the array can be maintained in its initial factory-optimized calibrated state. By having to adjust only a relatively small subset of registration coefficients from within a larger set of coefficients (which are typically determined using a specialized calibration target in a factory setting), far fewer matching patterns need to be identified in respective images captured by cameras in the array in order to correct for registration errors. Such simplified pattern matching may be performed using images that are captured during normal camera array usage so that registration may be performed in real-time in the field without the need for specialized calibration targets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 11 shows equations that describe registration in the idealized system shown in FIG. 10;

FIG. 12 shows simplified linear equations which describe registration in the idealized system shown in FIG. 10;

FIG. 13 shows an equation that describes a parallax effect that affects mapping between images captured by different cameras;

Like reference numerals indicate like elements in the drawings. Elements are not drawn to scale unless otherwise indicated.

DETAILED DESCRIPTION

Figure 1:
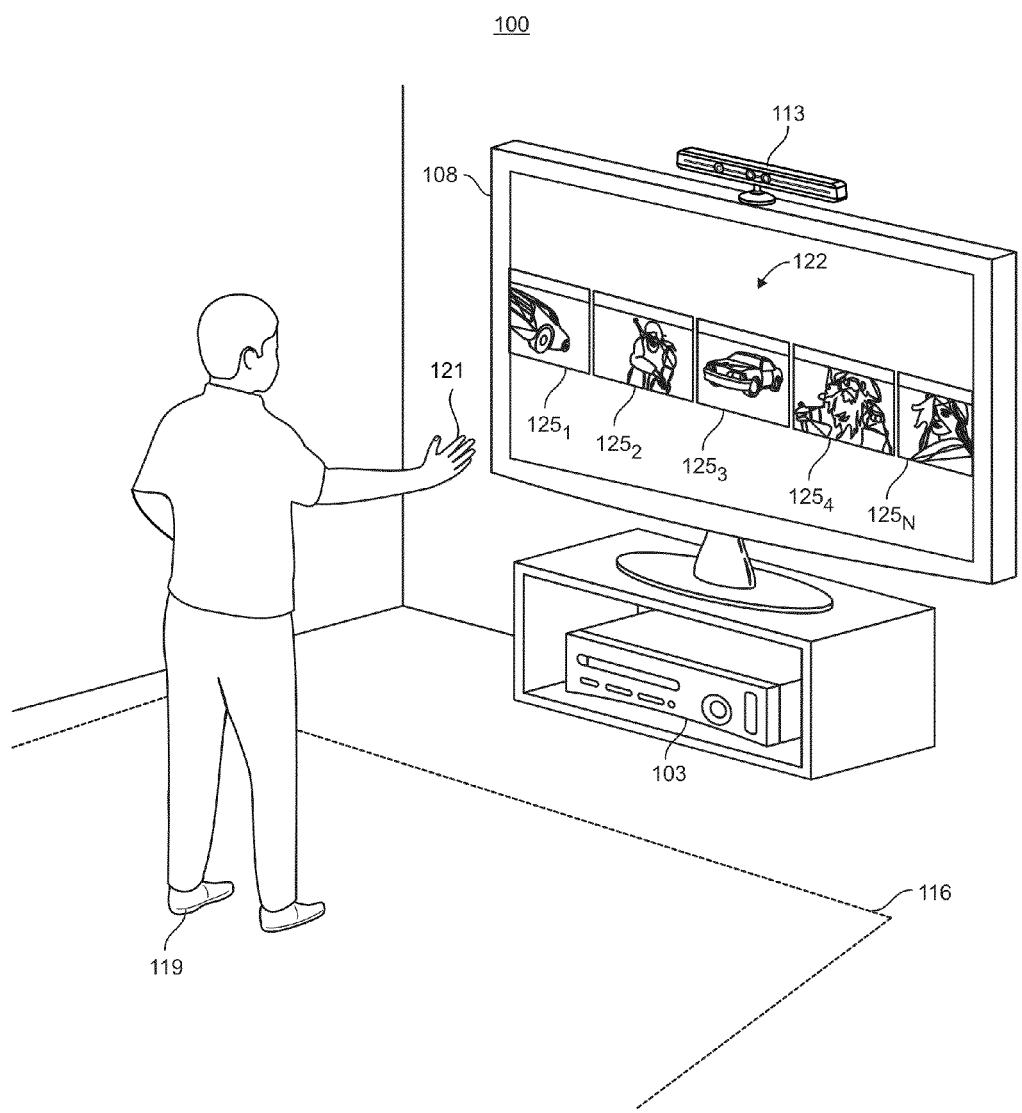
FIGS. 1 and 2 show an illustrative computing environment using a multimedia console in which the present real-time registration may be implemented.

FIG. 1 shows an illustrative computing environment 100 in which the present real-time registration may be implemented. It is emphasized that the environment 100 is intended to be illustrative and that other environments which include other types of devices, applications, and usage scenarios may also be able to utilize the principles described herein. The environment 100 includes a computing platform such as multimedia console 103 that is typically configured for running gaming and non-gaming applications using local and/or networked programming and content, playing pre-recorded multimedia such as optical discs including DVDs (Digital Versatile Discs) and CDs (Compact Discs), streaming multimedia from a network, participating in social media, browsing the Internet and other networked media and content, or the like using a coupled audio/visual display 108, such as a television.

The multimedia console 103 in this example is operatively coupled to a capture device 113 which may be implemented using one or more video cameras that are configured to visually monitor a physical space 116 (indicated generally by the dashed line in FIG. 1) that is occupied by a user 119. As described below in more detail, the capture device 113 is configured to capture, track, and analyze the movements and/or gestures of the user 119 so that they can be used as controls that may be employed to affect, for example, an application or an operating system running on the multimedia console 103. Various motions of the hands 121 or other body parts of the user 119 may correspond to common system-wide tasks such as selecting a game or other application from a main user interface.

For example as shown in FIG. 1, the user 119 can navigate among selectable objects 122 that include various icons $125_{1-N}$ that are shown on the coupled display 108, browse through items in a hierarchical menu, open a file, close a file, save a file, or the like. In addition, the user 119 may use movements and/or gestures to end, pause, or save a game, select a level, view high scores, communicate with a friend, etc. Virtually any controllable aspect of an operating system and/or application may be controlled by movements of the user 119. A full range of motion of the user 119 may be available, used, and analyzed in any suitable manner to interact with an application or operating system that executes in the environment 100.

Figure 2:
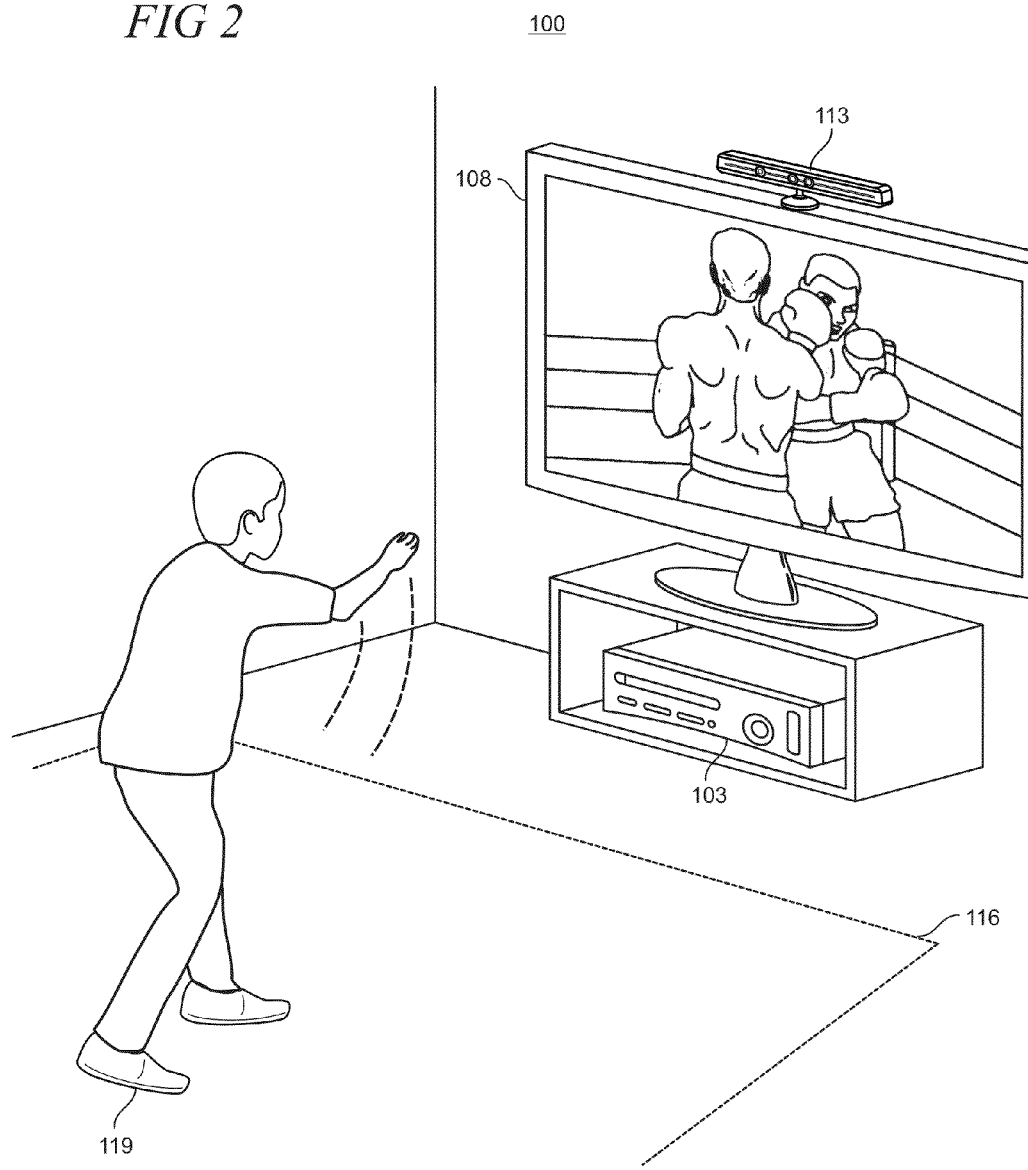

The capture device 113 can also be utilized to capture, track, and analyze movements by the user 119 to control gameplay as a gaming application executes on the multimedia console 103. For example, as shown in FIG. 2, a gaming application such as a boxing game uses the display 108 to provide a visual representation of a boxing opponent to the user 119 as well as a visual representation of a player avatar that the user 119 may control with his or her movements. The user 119 may make movements (e.g., throwing a punch) in the physical space 116 to cause the player avatar to make a corresponding movement in the game space. Movements of the user 119 may be recognized and analyzed in the physical space 116 such that corresponding movements for game control of the player avatar in the game space are performed.

Figure 3:
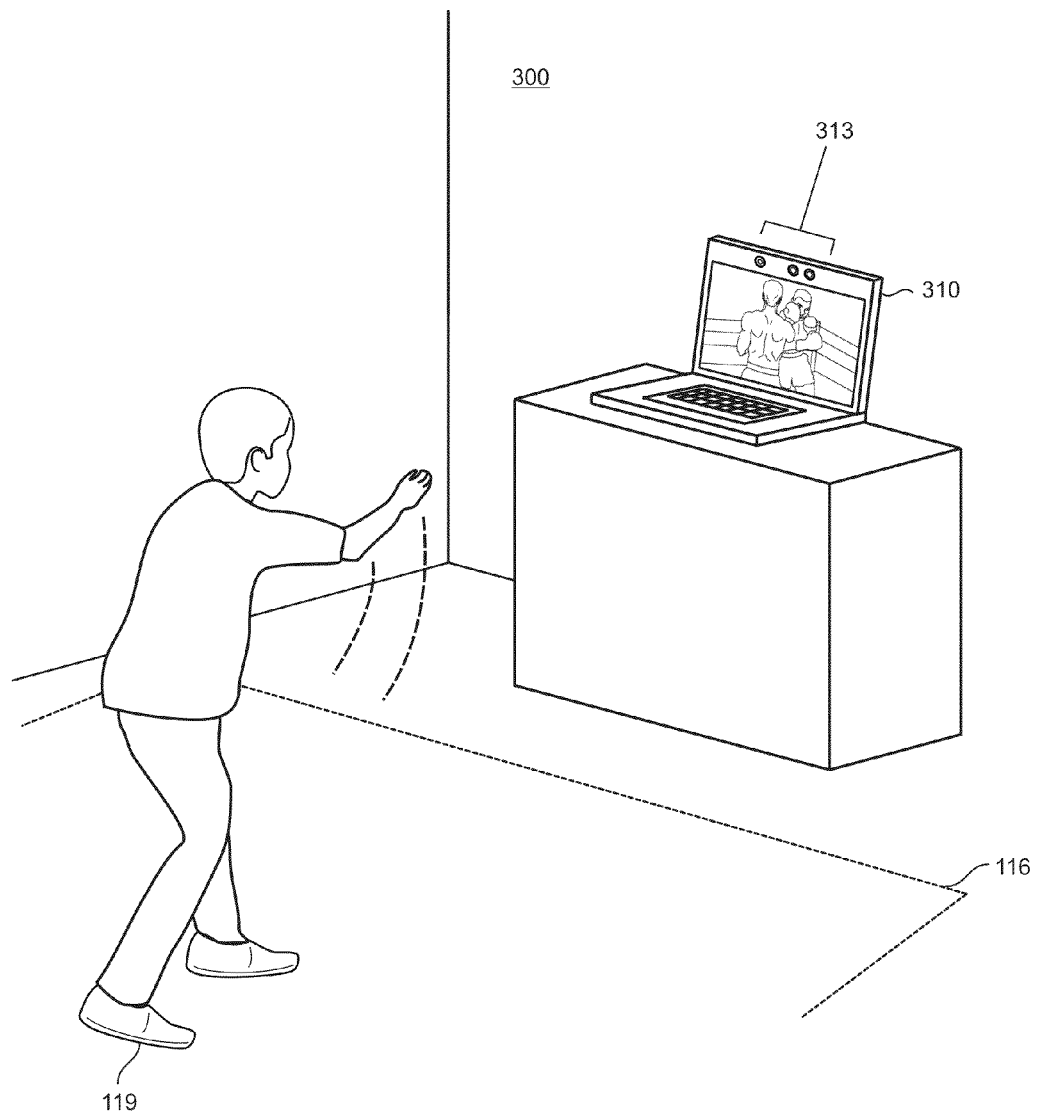
FIG. 3 shows an alternative computing environment using a personal computer in which the present real-time registration may be implemented.

FIG. 3 shows an alternative computing environment 300 in which the present real-time registration may be implemented. In this example, the environment 300 includes a laptop PC 310 (personal computer) that is configured to run game and non-game applications in which the user's motions are captured, tracked, and analyzed. A capture device 313, which may be arranged with similar functionalities to those provided by capture device 113 (FIGS. 1 and 2) is integrated into the laptop PC 310. However, the capture device can be alternatively configured as a standalone device that is couplable to the laptop PC 310 using conventional technologies including both wired and wireless connections.

Figure 4:
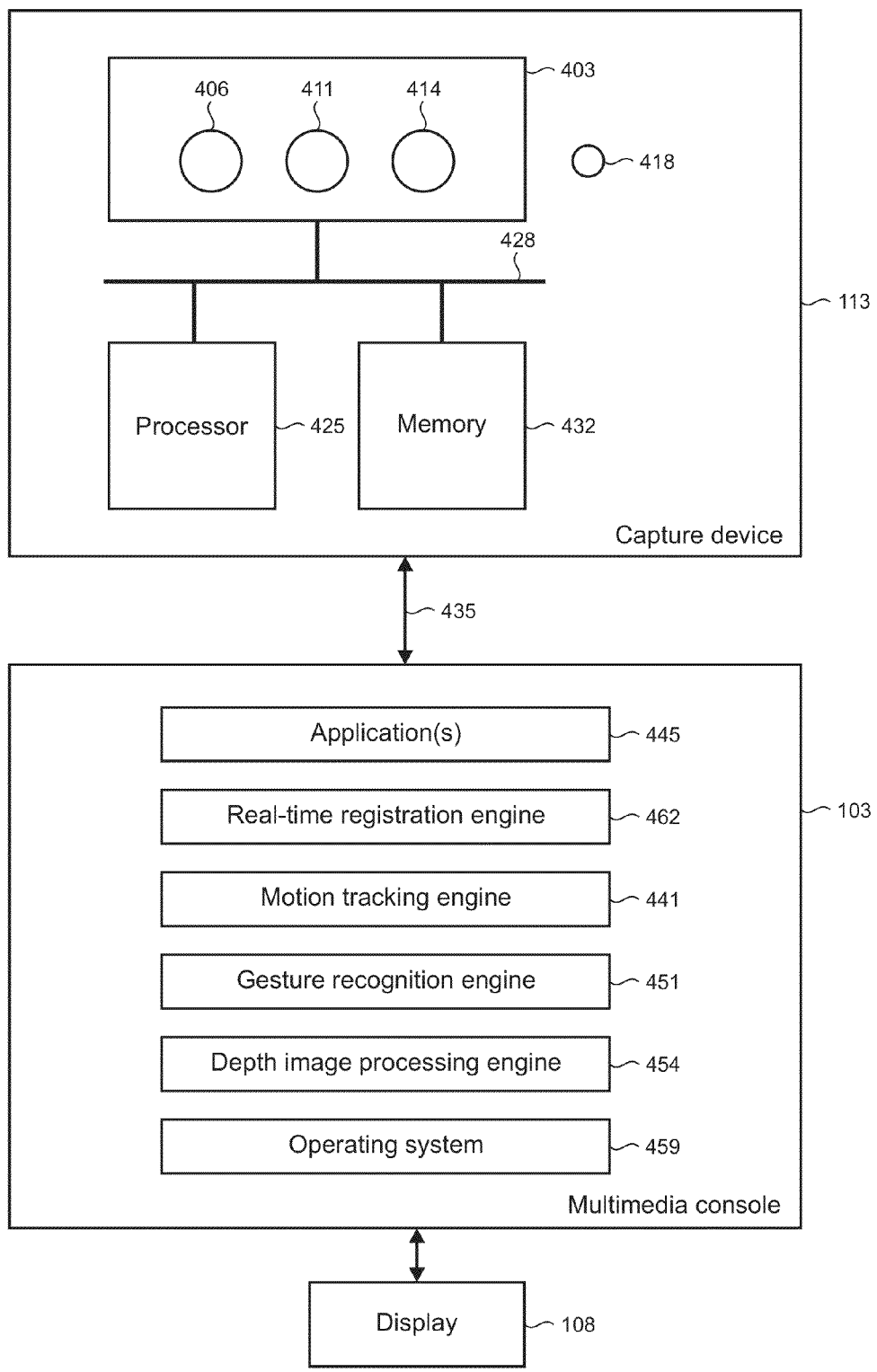
FIG. 4 shows an illustrative capture device that may be used in part to implement the present real-time registration.

FIG. 4 shows illustrative functional components of the capture device 113 (and/or capture device 313) that may be used as part of a target recognition, analysis, and tracking system 400 to recognize human and non-human targets in a capture area of the physical space 116 (FIG. 1) without the use of special sensing devices attached to the subjects, uniquely identify them, and track them in three-dimensional space. The capture device 113 may be configured to capture video with depth information including a depth image that may include depth values via any suitable technique including, for example, time-of-flight, structured light, stereo image, or the like. In some implementations, the capture device 113 may organize the calculated depth information into "Z layers," or layers that may be perpendicular to a Z-axis extending from the depth camera along its line of sight.

As shown in FIG. 4, the capture device 113 includes an image camera component 403. The image camera component 403 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, the image camera component 403 includes an IR light component 406, an IR camera 411, and a visible light RGB camera 414 that are configured in an array.

Various techniques may be utilized to capture depth video frames. For example, in time-of-flight analysis, the IR light component 406 of the capture device 113 may emit an infrared light onto the capture area and may then detect the backscattered light from the surface of one or more targets and objects in the capture area using, for example, the IR camera 411 and/or the RGB camera 414. In some embodiments, pulsed infrared light may be used such that the time between an outgoing light pulse and a corresponding incoming light pulse may be measured and used to determine a physical distance from the capture device 113 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects. Time-of-flight analysis may be used to indirectly determine a physical distance from the capture device 113 to a particular location on the targets or objects by analyzing the intensity of the reflected beam of light over time via various techniques including, for example, shuttered light pulse imaging.

In other implementations, the capture device 113 may use structured light to capture depth information. In such an analysis, patterned light (i.e., light displayed as a known pattern such as a grid pattern or a stripe pattern) may be projected onto the capture area via, for example, the IR light component 406. Upon striking the surface of one or more targets or objects in the capture area, the pattern may become deformed in response. Such a deformation of the pattern may be captured by, for example, the IR camera 411 and/or the RGB camera 414 and may then be analyzed to determine a physical distance from the capture device to a particular location on the targets or objects.

The capture device 113 may utilize two or more physically separated cameras that may view a capture area from different angles, to obtain visual stereo data that may be resolved to generate depth information. Other types of depth image arrangements using single or multiple cameras can also be used to create a depth image. The capture device 113 may further include a microphone 418. The microphone 418 may include a transducer or sensor that may receive and convert sound into an electrical signal. The microphone 418 may be used to reduce feedback between the capture device 113 and the multimedia console 103 in the target recognition, analysis, and tracking system 400. Additionally, the microphone 418 may be used to receive audio signals that may also be provided by the user 119 to control applications such as game applications, non-game applications, or the like that may be executed by the multimedia console 103.

The capture device 113 may further include a processor 425 that may be in operative communication with the image camera component 403 over a bus 428. The processor 425 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. The capture device 113 may further include a memory component 432 that may store the instructions that may be executed by the processor 425, images or frames of images captured by the cameras, user profiles or any other suitable information, images, or the like. According to one example, the memory component 432 may include random access memory (RAM), read only memory (ROM), cache, Flash memory, a hard disk, or any other suitable storage component. As shown in FIG. 4, the memory component 432 may be a separate component in communication with the image capture component 403 and the processor 425. Alternatively, the memory component 432 may be integrated into the processor 425 and/or the image capture component 403. In one embodiment, some or all of the components 403, 406, 411, 414, 418, 425, 428, and 432 of the capture device 113 are located in a single housing.

The capture device 113 operatively communicates with the multimedia console 103 over a communication link 435. The communication link 435 may be a wired connection including, for example, a USB (Universal Serial Bus) connection, a Firewire connection, an Ethernet cable connection, or the like and/or a wireless connection such as a wireless IEEE 802.11 connection. The multimedia console 103 can provide a clock to the capture device 113 that may be used to determine when to capture, for example, a scene via the communication link 435. The capture device 113 may provide the depth information and images captured by, for example, the IR camera 411 and/or the RGB camera 414, including a skeletal model and/or facial tracking model that may be generated by the capture device 113, to the multimedia console 103 via the communication link 435. The multimedia console 103 may then use the skeletal and/or facial tracking models, depth information, and captured images to, for example, create a virtual screen, adapt the user interface, and control an application.

A motion tracking engine 441 uses the skeletal and/or facial tracking models and the depth information to provide a control output to one more applications (representatively indicated by an application 445 in FIG. 4) running on the multimedia console 103 to which the capture device 113 is coupled. The information may also be used by a gesture recognition engine 451, depth image processing engine 454, operating system 459, and/or real-time registration engine 462. As described in more detail in the text accompanying FIG. 23, the real-time registration engine 462 may be utilized to provide real-time correction of registration errors that may occur in the use environments 100 and 300, for example, due to changes in temperature (i.e., as the system warms up from ambient room temperature to its normal operating temperature) or from physical perturbations in the system that may occur when a user accidently drops or knocks the capture device 113.

The depth image processing engine 454 uses the depth images to track motion of objects, such as the user and other objects. The depth image processing engine 454 will typically report to operating system 459 an identification of each object detected and the location of the object for each frame. The operating system 459 can use that information to update the position or movement of an avatar, for example, or other images shown on the display 108, or to perform an action on the user interface.

The gesture recognition engine 451 may utilize a gestures library (not shown) that can include a collection of gesture filters, each comprising information concerning a gesture that may be performed, for example, by a skeletal model (as the user moves). The gesture recognition engine 451 may compare the frames captured by the capture device 113 in the form of the skeletal model and movements associated with it to the gesture filters in the gesture library to identify when a user (as represented by the skeletal model) has performed one or more gestures. Those gestures may be associated with various controls of an application. Thus, the multimedia console 103 may employ the gestures library to interpret movements of the skeletal model and to control an operating system or an application running on the multimedia console based on the movements.

In some implementations, various aspects of the functionalities provided by the applications 445, real-time registration engine 462, motion tracking engine 441, gesture recognition engine 451, depth image processing engine 454, and/or operating system 459 may be directly implemented on the capture device 113 itself.

Figure 5:
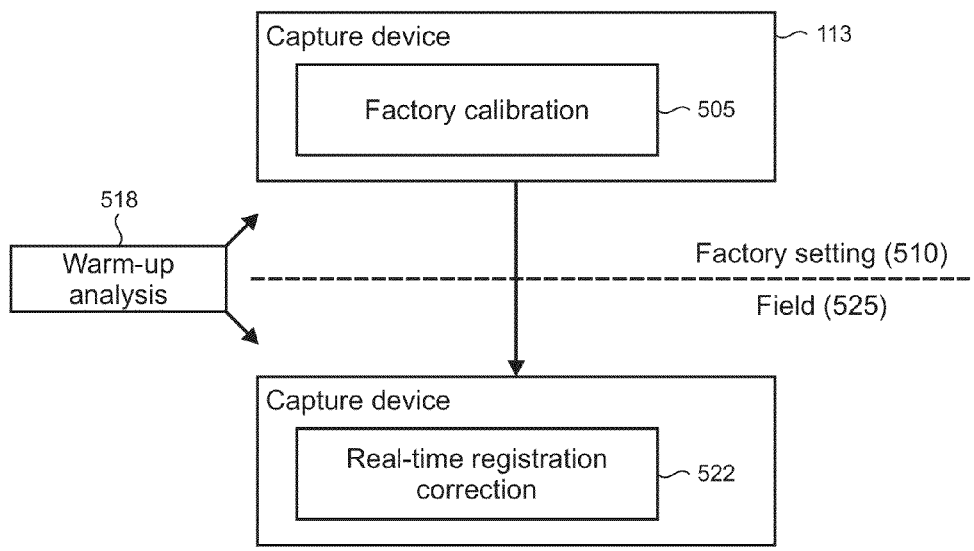
FIG. 5 is a diagram that shows an overview of the methodology used to implement the present real-time registration.
Figure 6:
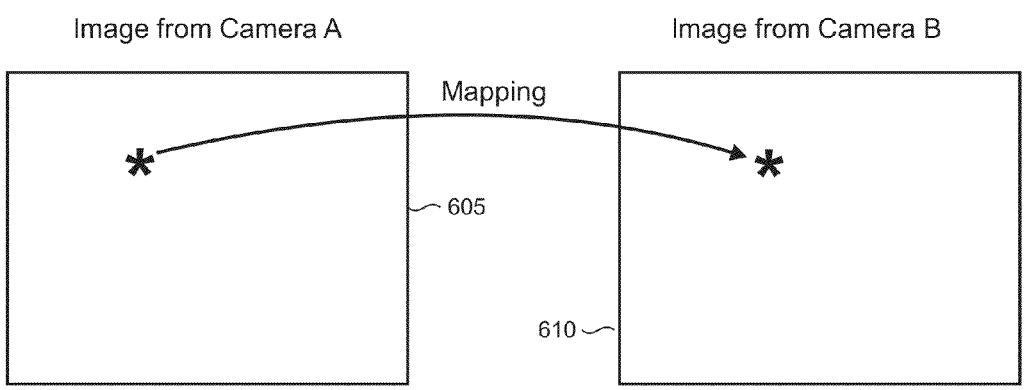
FIG. 6 shows how registration comprises features being mapped from an image captured by one camera to an image captured by another camera.

FIG. 5 is a diagram that shows an overview of the methodology used to implement the present real-time registration. Here, the capture device 113 is provided with a calibration 505 in a factory setting 510 to enable registration between images captured by the respective IR and RGB cameras. As shown in FIG. 6, the term "registration" refers to the concept of mapping features in an image captured by one camera (e.g., an image captured by Camera A as indicated by reference numeral 605) to an image captured by another camera (e.g., an image captured by Camera B as indicated by reference numeral 610). Thus, with the present capture device 113, Camera A may be the IR camera 411 and Camera B may be the RGB camera 414.

Returning to FIG. 5, a warm-up analysis 518 (described in more detail in the text accompanying FIGS. 17-22 below) of the typical behavior of illustrative capture devices is provided in order that real-time registration correction 522 may be implemented on the capture device 113 when it is deployed in the field 525.

Figure 7:
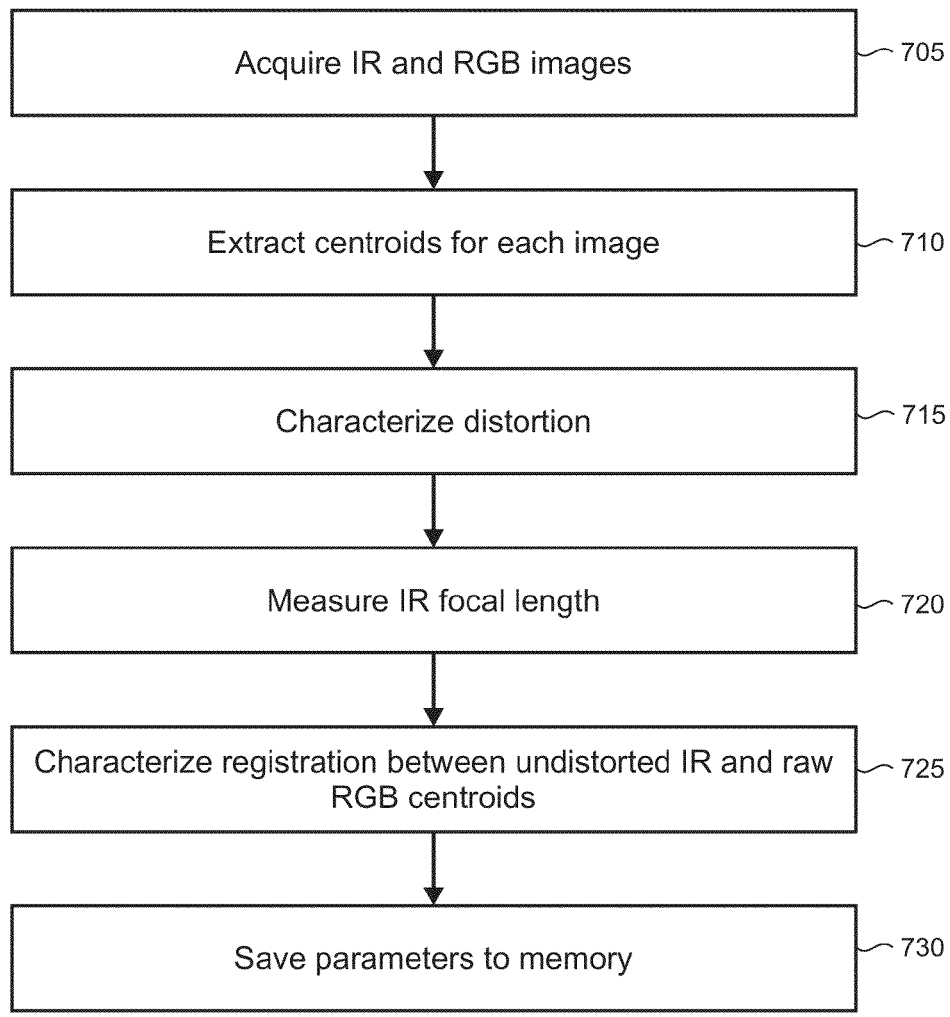
FIG. 7 is a flowchart of an illustrative factory calibration method.
Figure 8:
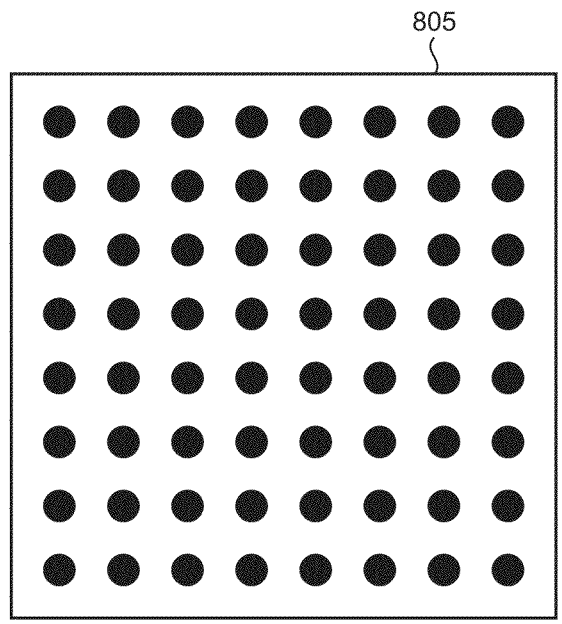
FIGS. 8 and 9 show illustrative calibration targets.
Figure 9:
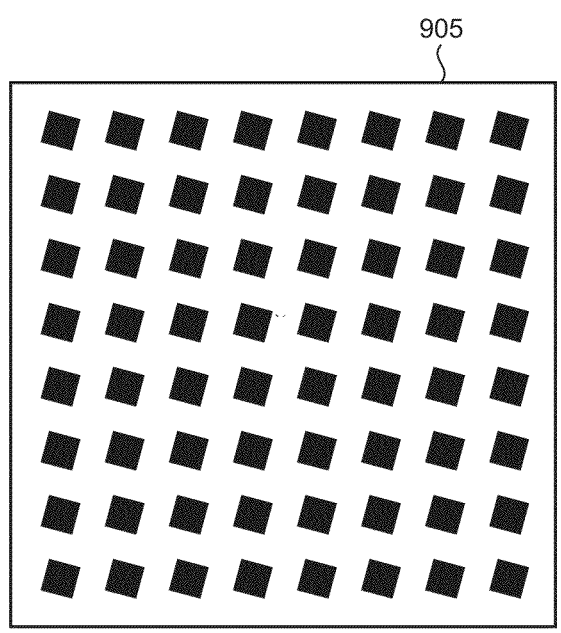

FIG. 7 is a flowchart of an illustrative factory calibration method 700. Unless specifically stated, the methods or steps in the flowchart of FIG. 7 and those in the other flowcharts shown in the drawings and described below are not constrained to a particular order or sequence. In addition, some of the methods or steps thereof can occur or be performed concurrently and not all the methods or steps have to be performed in a given implementation depending on the requirements of such implementation and some methods or steps may be optionally utilized. The method starts at block 705 in which each of the IR and RGB cameras acquires an image of a calibration target. In an illustrative example, the calibration target is made up of circular objects that are arranged in a rectangular grid pattern. It is emphasized, however, that the calibration target may be alternatively arranged using differently shaped objects and/or using a different number of objects depending on the requirements of a particular implementation. For example, multiple images may be acquired of a single target or multiple targets. In some cases, a camera may be moved to different locations relative to a fixed target. FIGS. 8 and 9 respectively show an illustrative calibration target 805 including a rectilinear grid of circles and an illustrative calibration target 905 including a rectilinear grid of squares. It will be appreciated that a variety of methodologies may be utilized to identify specific target locations. For example, a common methodology applies an algorithm to a checkerboard pattern to identify intersections of perpendicular lines with sub-pixel accuracy.

Returning to FIG. 7, at block 710 centroids of each of the objects are extracted from each of the images. At block 715 the distortion is characterized in either or both of the captured images. Alternatively, distortion may be left uncharacterized in some cases. It is also noted that not all cameras in a given array need explicit calibration in all cases, or they may be calibrated in light of a selected number or type of intrinsic parameters. Here, intrinsic parameters may include, for example, focal length, principal point, camera rotation parameters, camera distortion parameters, pixel skew, pixel dimensions, and the like. Other intrinsic parameters may also be calculated. At block 720, the IR focal length is measured. The registration between undistorted IR and raw RGB centroids is characterized at block 725. Parameters associated with such characterization are saved to memory at block 730.

It is noted that the factory calibration method discussed above takes advantage of depth acquisition using a single camera. However, it will be appreciated that the method may be adapted for use with conventional stereoscopic systems as well. In addition, factory calibration does not need to be utilized in all instances in order for the real-time registration techniques discussed below to be utilized.

Figure 10:
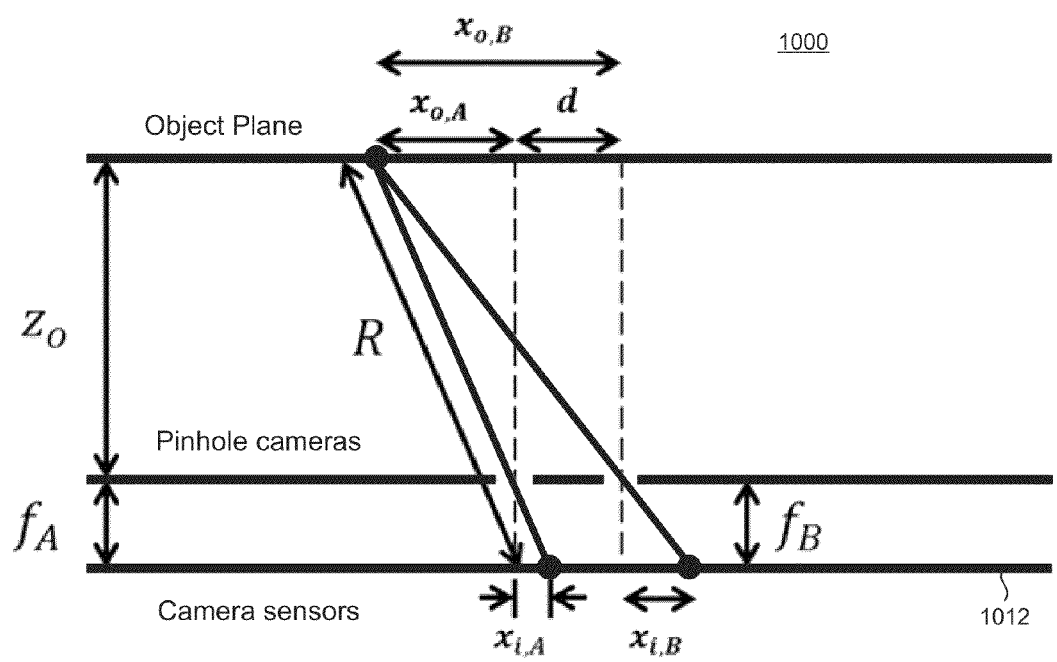
FIG. 10 is a diagram that illustrates registration for an idealized system.

FIG. 10 is a diagram that illustrates how the registration described above may be implemented for an idealized system 1000 in which two relatively well-aligned pinhole cameras A and B, having respective focal lengths $f_A$ and $f_B$ are separated by distance d on a camera sensor 1012. While two cameras are shown in FIG. 10, it will be appreciated that registration may be scaled to any number of cameras and not every camera needs to be registered to every other camera. Registration in the system 1000 is described by equations 1100 and 1105 in FIG. 11 in terms of intrinsic parameters, scale factors, and a parallax term which shows the mapping of pixels in X and Y directions from Camera B to Camera A. Equations 1100 and 1105 are simplified to the set of linear equations 1200 and 1205 shown in FIG. 12. However, for the single calibration target used here, the parallax term is not uniquely determined. That is, the mapping between IR and RGB images is valid only at the given distance or depth ($z_o$ in FIG. 10) between the cameras and the object plane in which the calibration target is located. Equation 1300 in FIG. 13 describes this parallax effect $\Delta x$ which is linearly dependent on depth $z_o$, camera separation, d, and $\Delta z$, the distance an object is relative to the original single calibration plane.

Figures 14, 15, 16:
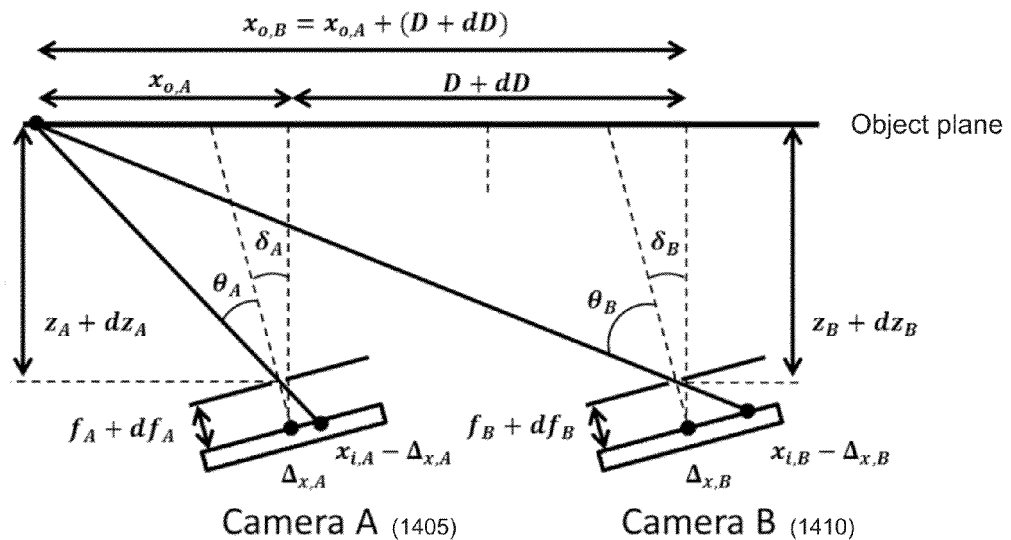
FIG. 14 is a diagram that illustrates registration for a system that is more complex than the idealized system shown in FIG. 10.
FIG. 15 shows an illustrative mapping function.
FIG. 16 shows a Taylor series representation of the mapping function.

FIG. 14 is a diagram that illustrates how the registration may be implemented for a more complex system 1400 than that shown in FIG. 10. In this case, the system 1400 is modeled after a more realistic system in which the cameras A and B (respectively indicated by reference numerals 1405 and 1410) may be tilted, rotated, or shifted and may also have different focal lengths and not be located along the same depth plane. Such variable camera orientations may be part of a purposeful design, or changes in orientation may not be intentional but arise from changes in system temperature or physical perturbations, for example. The system 1400 may be described by the mapping function 1500 shown in FIG. 15.

In the particular illustrative system described here, function 1500 may be represented using a Taylor series shown in FIG. 16 in which two polynomials (equations 1605 and 1610) each include a number of registration coefficients, c, as well as x and y cross terms to account for camera rotation along all three axes. The combination of registration coefficients can vary according to system complexity and to model other effects. For example, there could be more residual distortion from one of the cameras that was not corrected, or was purposefully left uncorrected, or the cameras are tilted and/or rotated about their optical axes. In such cases, the mapping function from Camera A to Camera B becomes more complicated and additional registration coefficients may be needed.

For example, the more distortion or the more tilted the cameras are in a given system, the more registration coefficients might be utilized.

In one particular example, each polynomial mapping function equation uses 10 registration coefficients. And, as with the idealized system of FIG. 10, registration away from the calibration plane is accomplished by estimating the expected linear shift, $\Delta x$, based on the distance away from the calibration plane. It is emphasized that combinations of registration coefficients other than those shown in FIG. 16 may also be utilized to model other systems that differ from the illustrative system shown and described here.

Figure 17:
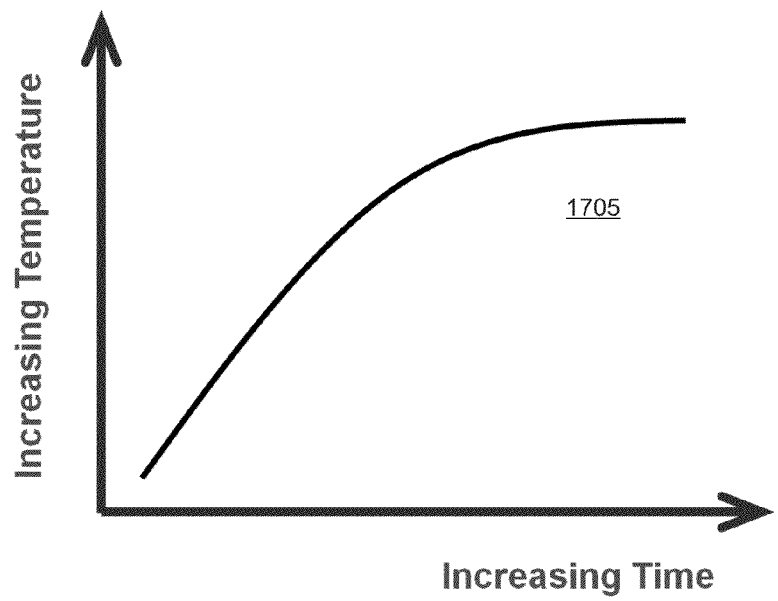
FIG. 17 shows an illustrative curve which plots temperature versus time for an exemplary capture device.
Figure 18:
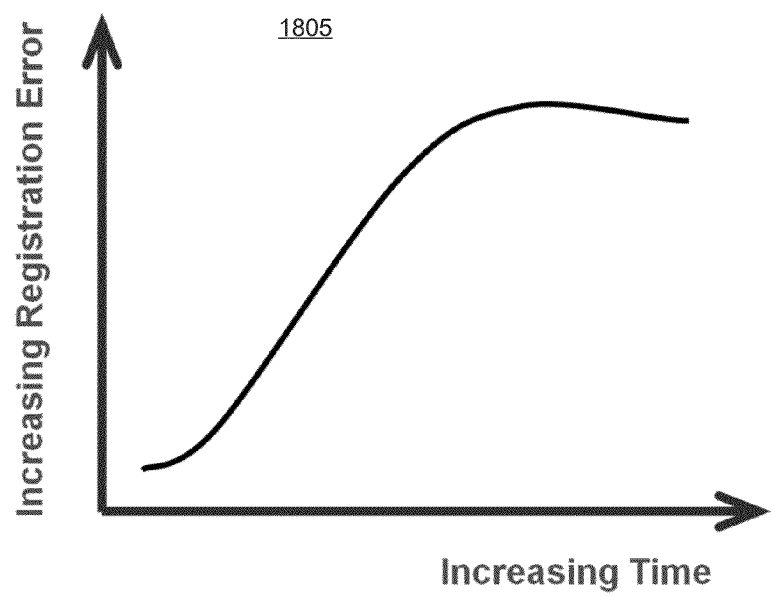
FIG. 18 shows illustrative registration error over time for an exemplary capture device.

The warm-up analysis referred to above when discussing FIG. 5 will now be described in more detail. FIG. 17 shows a curve 1705 which plots temperature of an illustrative capture device versus time. The curve 1705 represents a typical warm-up behavior when the capture device is started from cold (i.e., room temperature). FIG. 18 shows a curve 1805 that represents registration error, $IR_{px}$, for the exemplary capture device over time assuming the cameras were initially well registered with the factory-optimized calibration at time zero. Thus, FIG. 18 shows how registration error may be temperature dependent and suggests that parameters associated with the IR camera 411 and RGB camera 414 (FIG. 4) are changing with temperature.

Figure 19:
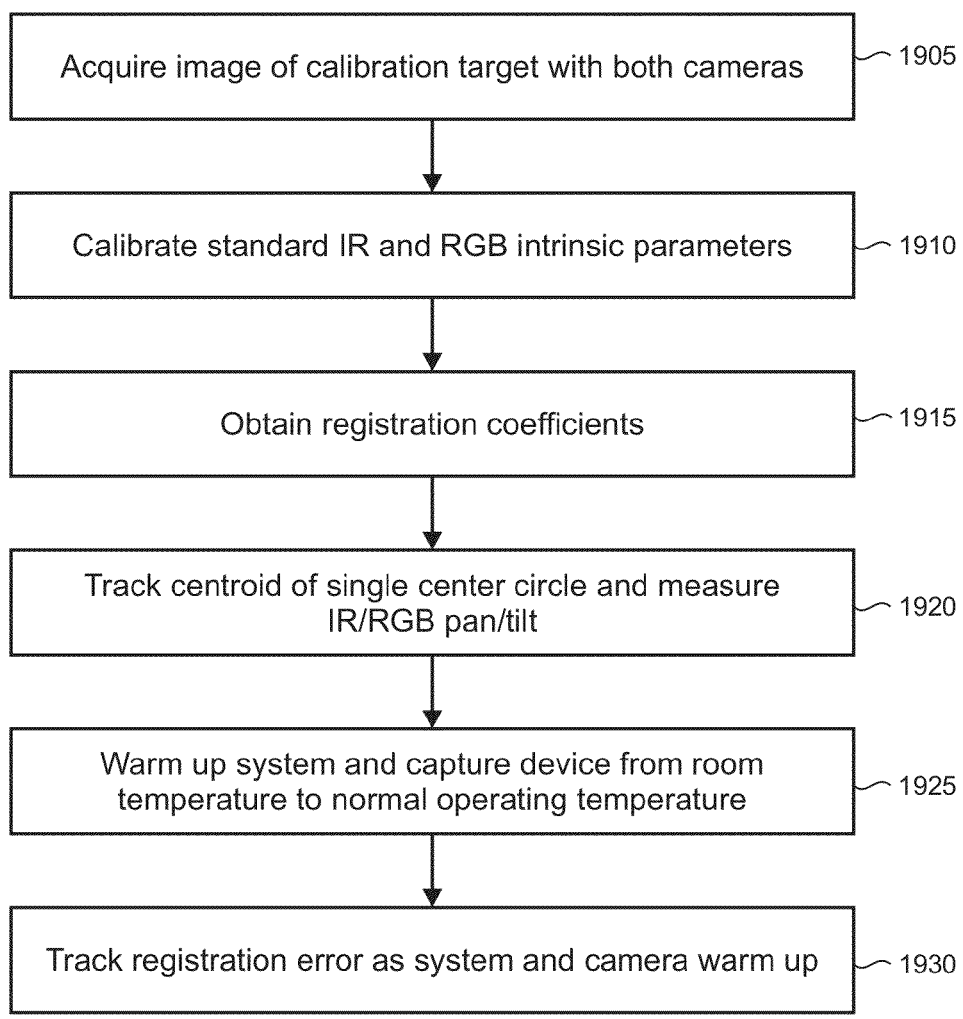
FIG. 19 is a flowchart of an illustrative warm-up analysis.

FIG. 19 is a flowchart of an illustrative warm-up analysis 1900. At block 1905, images of one or more calibration targets are captured by each of the IR and RGB cameras, for example in a similar manner as with the factory calibration described above in reference to FIG. 7, and the IR and RGB intrinsic parameters are calibrated at block 1910. At block 1915, the registration coefficients for the polynomial mapping function (equations 1605 and 1610) are determined. At block 1920, the centroid of the center-most object in the calibration target is tracked and any pan/tilt of the IR and RGB cameras is measured.

The system including the capture device 113 is then warmed up from room temperature (i.e., cold) to its normal operating temperature over some time interval, at block 1925. During the warm-up, the registration error is tracked, at block 1930. Tracking can be performed frame-by-frame, for example. Since the centroids from the calibration target are available, it is possible to recalibrate cameras at each frame and determine how the registration coefficients need to be tweaked (i.e., modified) in order to maintain the factory-optimized camera registration over the course of the entire warm-up time interval. By tracking the change in registration coefficients over the time interval, sensitivity analyses may be performed to determine which registration coefficients need to change the most in order to maintain the factory-optimized calibration. That is, registration coefficients that are responsible for the largest registration error may be identified from the warm-up analysis.

Figure 20:
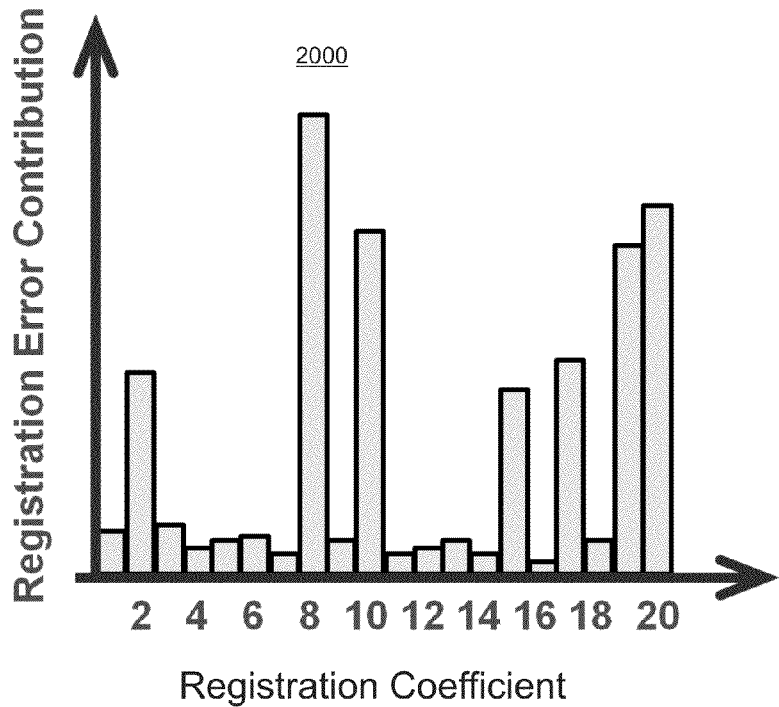
FIGS. 20-22 are histograms which plot registration error for each of 20 registration coefficients for three different systems.
Figure 21:
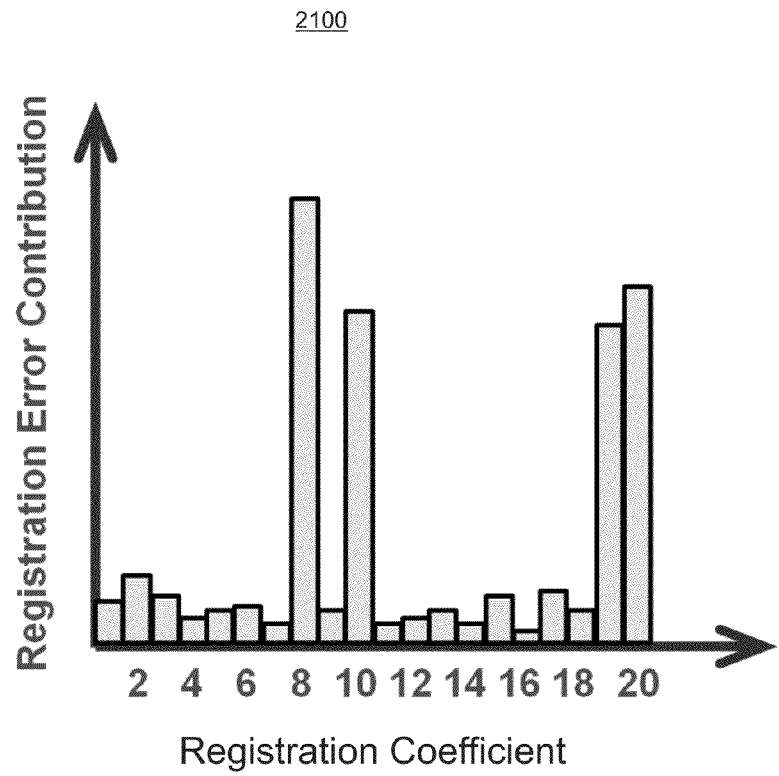
Figure 22:
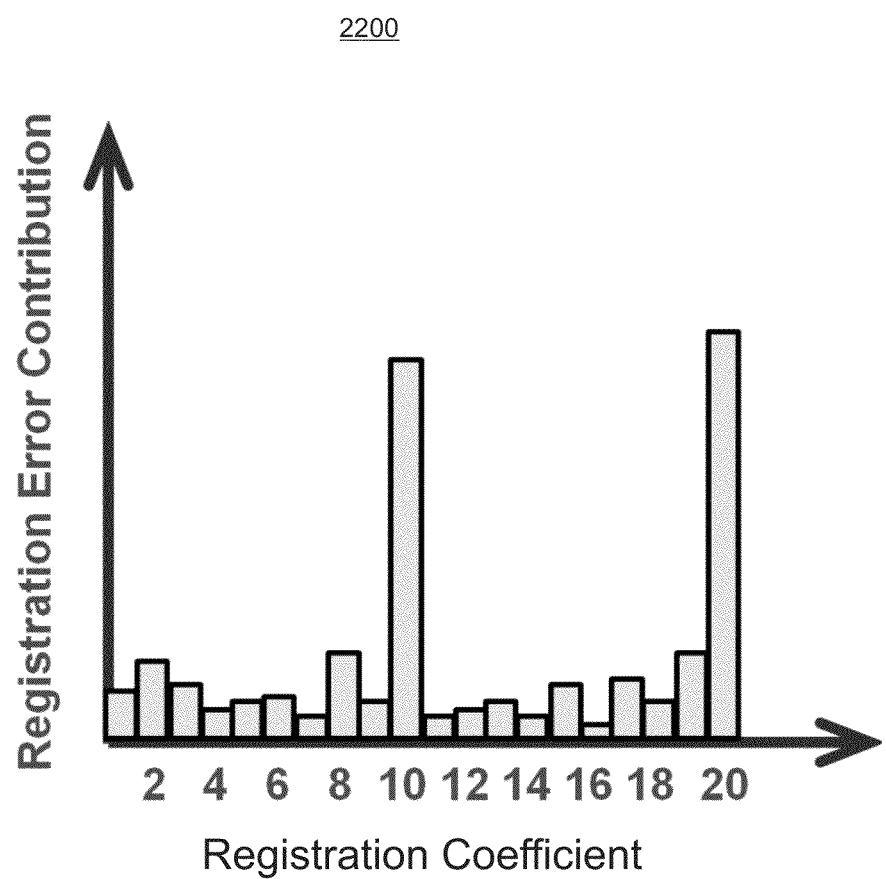

FIGS. 20-22 show respective histograms 2000, 2100, and 2200 which plot registration error for each of the 20 registration coefficients which are used in the mapping function polynomial equations for three different illustrative systems. As shown in FIGS. 20-22, most of the registration errors are small which likely indicates that a particular capture device is designed in a way that minimizes changes (e.g., camera rotation or changes in focal length and/or distortion) with temperature. However, in each of the histograms, certain registration coefficients are observed to contribute the largest error which suggests that they are the most sensitive to temperature. As shown in FIGS. 20-22, the camera system represented by histogram 2000 comparatively has the largest number of coefficients that contribute to registration error, while histogram 2100 represents a system with fewer contributing coefficients, and histogram 2200 represents a system with the fewest. Accordingly, the warm-up analysis shows that while the mapping function polynomial equations described here utilize 20 registration coefficients, only certain coefficients will typically contribute meaningfully to the observed registration errors over the warm-up time interval. However, it is emphasized that other systems using different design parameters may exhibit different sensitivities which could result in more, or fewer, independent registration coefficients contributing to registration error. In addition, certain coefficients in some systems may be highly correlated which can reduce the number of parameters that need to be corrected.

The results of the warm-up analysis advantageously enable real-time registration error correction to be implemented in the field as typically a relatively small number of unknowns (and not 20) need to be taken into account. In addition, in some cases the independent registration coefficients may include only linear stretch and/or constant offset terms so that the mapping function essentially becomes a simple affine transformation.

It is noted that the warm-up analysis discussed above takes advantage of depth acquisition using a single camera. However, it will be appreciated that the method may be adapted for use with conventional stereoscopic systems as well.

Figure 23:
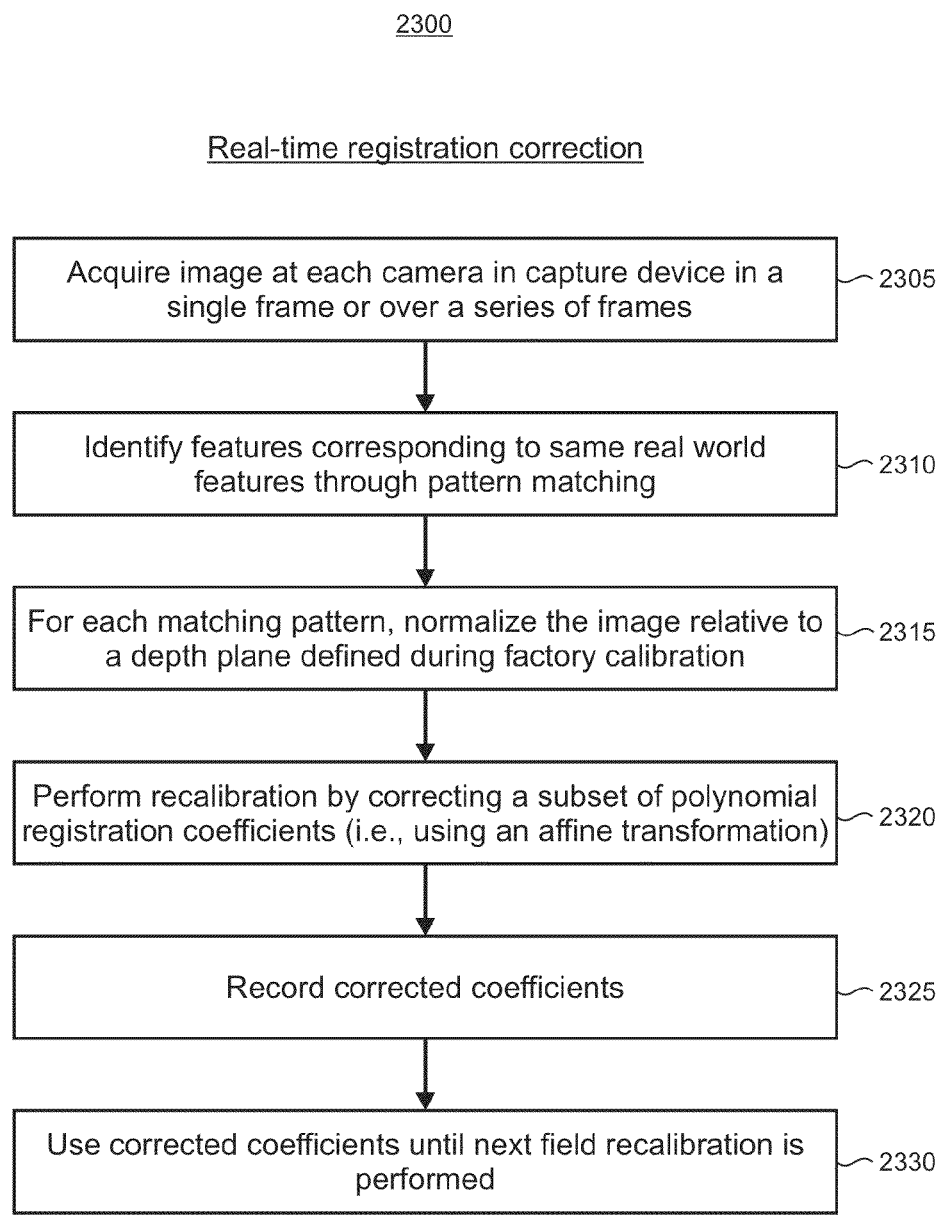
FIG. 23 is a flowchart of an illustrative real-time registration correction method.

FIG. 23 is a flowchart of an illustrative real-time registration correction method 2300 that may be employed in the field without needing to utilize the calibration target as in the factory calibration. In some cases, the method 2300 may be implemented using the real-time registration engine 462 (FIG. 4).

The method begins at block 2305 in which images of monitored physical space 116 (FIG. 1) are acquired by the IR camera 411 and RGB camera 414 in a single frame or over a series of frames. Features in the acquired images that correspond to the same real world features are identified through conventional pattern matching at block 2310. For example, patterns can be located in an identified part of the user's body such as head, arm, or leg or through features contained in the background. Typically, separate patterns are sought in order to tweak the corresponding number of independent registration coefficients as needed to correct for the registration error, although more identified matching patterns can result in additional robustness of the error correction method in some implementations. Advantageously, since the registration error under most conditions is a relatively slow changing effect over time, there is typically no need to capture all the patterns in a single frame.

At block 2315, for each matching pattern, the image is normalized relative to the depth plane defined during the factory calibration, as described above. This is typically needed because the identified matching patterns may not necessarily have been captured at the same depth. Once the patterns meeting some pre-defined threshold of correlation are located in the captured images, the registration coefficients contributing to registration error can be tweaked/corrected. That is, as shown at block 2320, only a relatively small subset of the registration coefficients needs to be corrected in order to perform the recalibration. The corrected registration coefficients are recorded, at block 2325, and used until another field recalibration is performed at block 2330.

It is noted that the real-time registration correction method for field recalibration discussed above takes advantage of depth acquisition using a single camera. However, it will be appreciated that the method may be adapted for use with conventional stereoscopic systems as well.

Field recalibration can be performed periodically or in situations where an application 445 (FIG. 4) detects or suspects that registration errors may be causing performance issues. For example, field recalibration might be performed when the multimedia console 103 (FIG. 1) is initially booted up and/or when it wakes from sleep mode. In such cases it can be expected that a user will be within the monitored physical space which may be expected to facilitate pattern matching.

The need for pattern matching can be eliminated in some cases using an alternative methodology. For example, it can typically be expected that the amount of tweaking applied to the temperature-sensitive registration coefficients to bring the system back to its well calibrated nominal state will be reasonably well correlated to the observed temperatures of the capture device. Accordingly, a set of corrections mapped to temperature can be generated for each of the independent registration coefficients and stored to create pre-calibrated registration corrections. One or more temperature sensors located within the capture device may then be utilized to measure the temperature of the capture unit at given points of time during operation and apply an appropriate correction from the stored set. Such use of pre-calibrated registration correction can be useful, for example, in cases such as with the present illustrative system where focal length changes with temperature. The pre-calibrated registration correction may also be advantageously used in some applications to correct for errors in depth measurements resulting from changing focal length. This may be particularly useful in removing potential errors in the parallax correction when normalizing the pattern matching locations to the depth plane of the factory calibration.

The results of the warm-up analysis may also yield benefits that may be applied to the design of future capture devices and systems, particularly with regard to the management of thermal criteria as applied to mechanical and optical components. For example, it may be desirable to design such components in a way that reduces the number of registration coefficients that need correction. For example, the mechanical components of the capture device may be designed so that the relative pointing error between two or more cameras is not sensitive to temperature changes or physical perturbations. Similarly, optical components including the camera lens may be designed to reduce the number of registration coefficients that require correction. For example, the lens may be designed so that focal length and image distortion are independent of temperature. And, the lens and image sensor may be designed so that the center of optical distortion on the image sensor is independent of temperature or physical perturbations.

Figure 24:
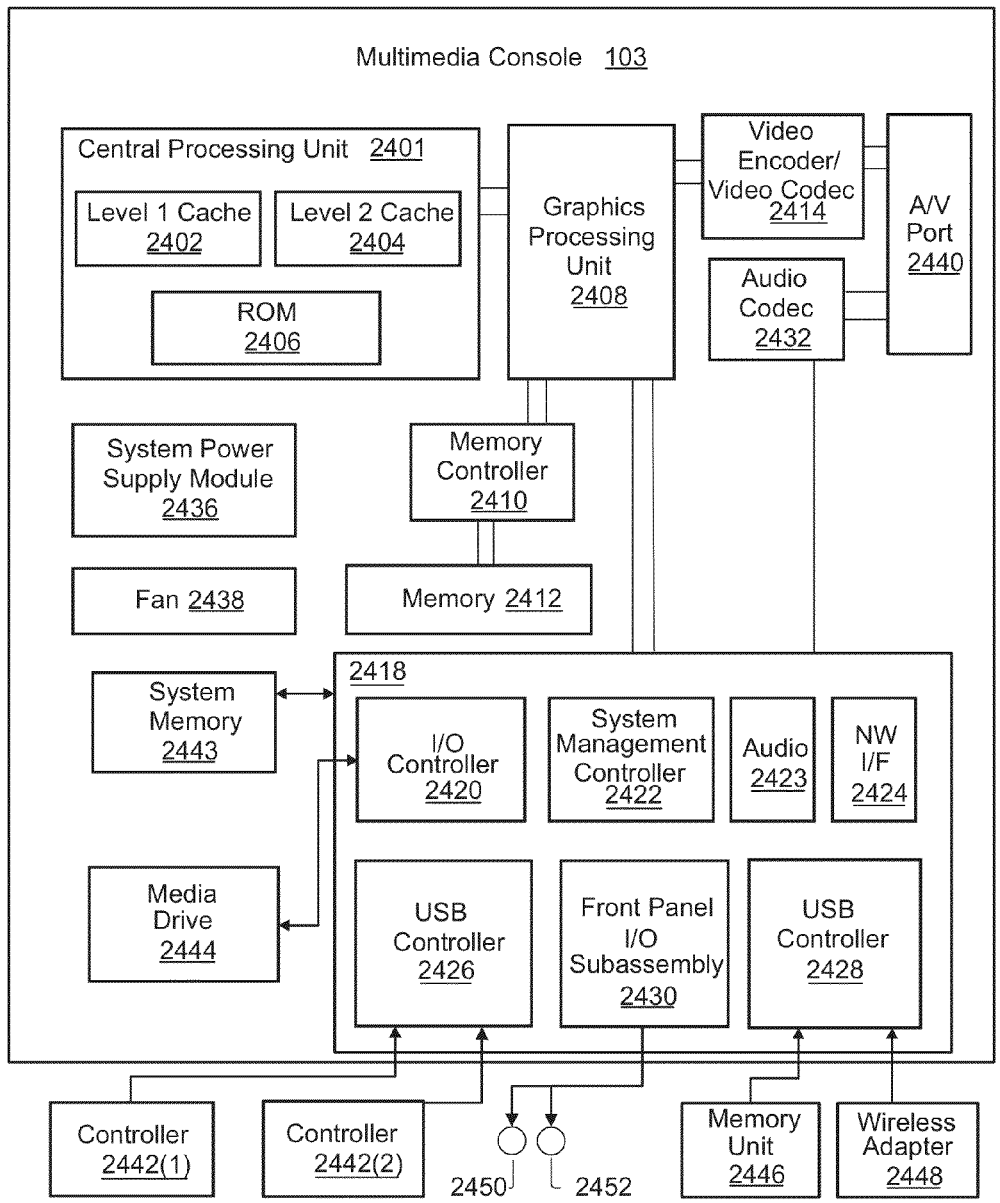
FIG. 24 shows a block diagram of an illustrative multimedia console that may be used in part to implement the present real-time registration.

FIG. 24 is an illustrative functional block diagram of the multimedia console 103 shown in FIGS. 1-2. As shown in FIG. 24 the multimedia console 103 has a central processing unit (CPU) 2401 having a level 1 cache 2402, a level 2 cache 2404, and a Flash ROM (Read Only Memory) 2406. The level 1 cache 2402 and the level 2 cache 2404 temporarily store data and hence reduce the number of memory access cycles, thereby improving processing speed and throughput. The CPU 2401 may be configured with more than one core, and thus, additional level 1 and level 2 caches 2402 and 2404. The Flash ROM 2406 may store executable code that is loaded during an initial phase of a boot process when the multimedia console 103 is powered ON.

A graphics processing unit (GPU) 2408 and a video encoder/video codec (coder/decoder) 2414 form a video processing pipeline for high speed and high resolution graphics processing. Data is carried from the GPU 2408 to the video encoder/video codec 2414 via a bus. The video processing pipeline outputs data to an A/V (audio/video) port 2440 for transmission to a television or other display. A memory controller 2410 is connected to the GPU 2408 to facilitate processor access to various types of memory 2412, such as, but not limited to, a RAM.

The multimedia console 103 includes an I/O controller 2420, a system management controller 2422, an audio processing unit 2423, a network interface controller 2424, a first USB host controller 2426, a second USB controller 2428, and a front panel I/O subassembly 2430 that are preferably implemented on a module 2418. The USB controllers 2426 and 2428 serve as hosts for peripheral controllers 2442(1)-2442(2), a wireless adapter 2448, and an external memory device 2446 (e.g., Flash memory, external CD/DVD ROM drive, removable media, etc.). The network interface controller 2424 and/or wireless adapter 2448 provide access to a network (e.g., the Internet, home network, etc.) and may be any of a wide variety of various wired or wireless adapter components including an Ethernet card, a modem, a Bluetooth module, a cable modem, or the like.

System memory 2443 is provided to store application data that is loaded during the boot process. A media drive 2444 is provided and may comprise a DVD/CD drive, hard drive, or other removable media drive, etc. The media drive 2444 may be internal or external to the multimedia console 103. Application data may be accessed via the media drive 2444 for execution, playback, etc. by the multimedia console 103. The media drive 2444 is connected to the I/O controller 2420 via a bus, such as a Serial ATA bus or other high speed connection (e.g., IEEE 1394).

The system management controller 2422 provides a variety of service functions related to assuring availability of the multimedia console 103. The audio processing unit 2423 and an audio codec 2432 form a corresponding audio processing pipeline with high fidelity and stereo processing. Audio data is carried between the audio processing unit 2423 and the audio codec 2432 via a communication link. The audio processing pipeline outputs data to the A/V port 2440 for reproduction by an external audio player or device having audio capabilities.

The front panel I/O subassembly 2430 supports the functionality of the power button 2450 and the eject button 2452, as well as any LEDs (light emitting diodes) or other indicators exposed on the outer surface of the multimedia console 103. A system power supply module 2436 provides power to the components of the multimedia console 103. A fan 2438 cools the circuitry within the multimedia console 103.

The CPU 2401, GPU 2408, memory controller 2410, and various other components within the multimedia console 103 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 103 is powered ON, application data may be loaded from the system memory 2443 into memory 2412 and/or caches 2402 and 2404 and executed on the CPU 2401. The application may present a graphical user interface that provides a consistent user experience when navigating to different media types available on the multimedia console 103. In operation, applications and/or other media contained within the media drive 2444 may be launched or played from the media drive 2444 to provide additional functionalities to the multimedia console 103.

The multimedia console 103 may be operated as a standalone system by simply connecting the system to a television or other display. In this standalone mode, the multimedia console 103 allows one or more users to interact with the system, watch movies, or listen to music. However, with the integration of broadband connectivity made available through the network interface controller 2424 or the wireless adapter 2448, the multimedia console 103 may further be operated as a participant in a larger network community.

When the multimedia console 103 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 103 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2401 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2442(1) and 2442(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The capture device 113 may define additional input devices for the console 103.

Figure 25:
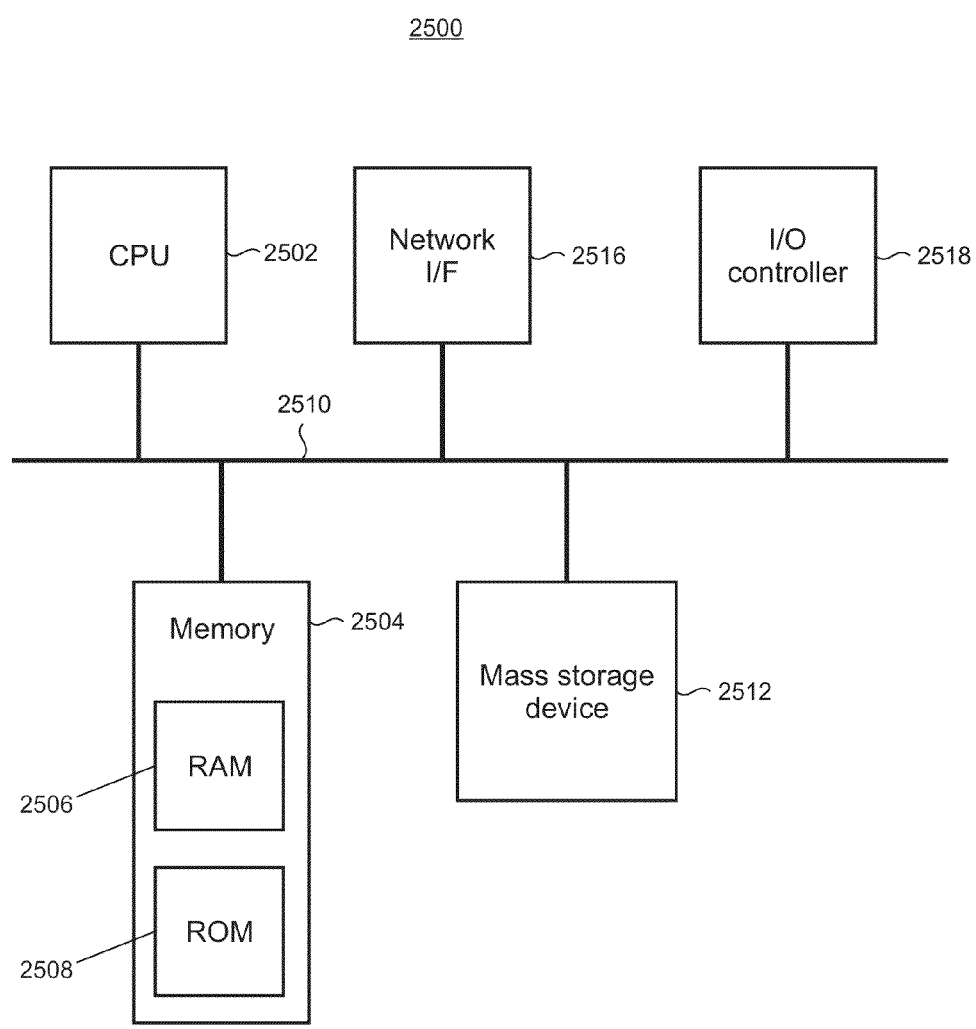
FIG. 25 shows a block diagram of an illustrative computing platform that may be used in part to implement the present real-time registration.

It may be desirable and/or advantageous to enable other types of computing platforms other than the illustrative media console 103 to implement the present real-time registration in some applications. For example, real-time registration may be readily adapted to run on fixed computing platforms and mobile computing platforms that have video capture capabilities. FIG. 25 shows an illustrative architecture 2500 for a computing platform or device capable of executing the various components described herein for providing real-time registration. Thus, the architecture 2500 illustrated in FIG. 25 shows an architecture that may be adapted for a server computer, mobile phone, a PDA (personal digital assistant), a smart phone, a desktop computer, a netbook computer, a tablet computer, GPS (Global Positioning System) device, gaming console, and/or a laptop computer (such as laptop PC 310 shown in FIG. 3 and described in the accompanying text). The architecture 2500 may be utilized to execute any aspect of the components presented herein.

The architecture 2500 illustrated in FIG. 25 includes a CPU 2502, a system memory 2504, including a RAM 2506 and a ROM 2508, and a system bus 2510 that couples the memory 2504 to the CPU 2502. A basic input/output system containing the basic routines that help to transfer information between elements within the architecture 2500, such as during startup, is stored in the ROM 2508. The architecture 2500 further includes a mass storage device 2512 for storing software code or other computer-executed code that is utilized to implement applications, the real-time registration engine, the motion tracking engine, the gesture recognition engine, the depth image processing engine, and the operating system which may configured with functionality and operations in a similar manner to those components shown in FIG. 3 and described in the accompanying text.

The mass storage device 2512 is connected to the CPU 2502 through a mass storage controller (not shown) connected to the bus 2510. The mass storage device 2512 and its associated computer-readable storage media provide non-volatile storage for the architecture 2500. Although the description of computer-readable storage media contained herein refers to a mass storage device, such as a hard disk or CD-ROM drive, it should be appreciated by those skilled in the art that computer-readable media can be any available computer storage media that can be accessed by the architecture 2500.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 2500. For purposes of this specification and the claims, the phrase "computer-readable storage medium" and variations thereof, does not include waves, signals, and/or other transitory and/or intangible communication media.

According to various embodiments, the architecture 2500 may operate in a networked environment using logical connections to remote computers through a network. The architecture 2500 may connect to the network through a network interface unit 2516 connected to the bus 2510. It should be appreciated that the network interface unit 2516 also may be utilized to connect to other types of networks and remote computer systems. The architecture 2500 also may include an input/output controller 2518 for receiving and processing input from a number of other devices, including a keyboard, mouse, microphone, joystick, game pad, satellite dish, scanner, trackball, touchpad, touch screen, touch-sensitive device, voice-command module or device, or electronic stylus (not shown in FIG. 25). Similarly, the input/output controller 2518 may provide output to a display screen, a printer, or other type of output device (also not shown in FIG. 25).

It should be appreciated that the software components described herein may, when loaded into the CPU 2502 and executed, transform the CPU 2502 and the overall architecture 2500 from a general-purpose computing system into a special-purpose computing system customized to facilitate the functionality presented herein. The CPU 2502 may be constructed from any number of transistors or other discrete circuit elements, which may individually or collectively assume any number of states. More specifically, the CPU 2502 may operate as a finite-state machine, in response to executable instructions contained within the software modules disclosed herein. These computer-executable instructions may transform the CPU 2502 by specifying how the CPU 2502 transitions between states, thereby transforming the transistors or other discrete hardware elements constituting the CPU 2502.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2500 in order to store and execute the software components presented herein. It also should be appreciated that the architecture 2500 may include other types of computing devices, including hand-held computers, embedded computer systems, smartphones, PDAs, and other types of computing devices known to those skilled in the art. It is also contemplated that the architecture 2500 may not include all of the components shown in FIG. 25, may include other components that are not explicitly shown in FIG. 25, or may utilize an architecture completely different from that shown in FIG. 25.

Based on the foregoing, it should be appreciated that technologies for providing and using real-time registration have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for providing real-time registration of a camera array, the method comprising the steps of:
   applying a mapping function to register features among images captured by respective cameras in the array, the mapping function being expressed, at least in part, using a set of parameters;
   providing an initial calibration to the camera array;
   identifying parameters associated with the initial calibration;
   selecting a subset of the set of parameters for adjustment, the selected subset of the set of parameters having a relatively large contribution to errors in registration that occur subsequent to the initial calibration as compared with non-selected parameters; and
   adjusting the selected subset of the set of parameters in order to correct the errors so the camera array is substantially returned to the initial calibration.

2. The method of claim 1 further including a step of matching patterns of real world features among images captured by cameras in the array, the images being contained in a single frame or a series of frames over a time interval.

3. The method of claim 2 further including a step of utilizing the matched patterns to adjust the selected subset of parameters.

4. The method of claim 1 further including a step of normalizing parallax associated with captured images relative to a depth plane utilized during the initial calibration.

5. The method of claim 1 further including a step of recording the adjusted subset of parameters.

6. The method of claim 1 further including a step of utilizing the adjusted subset of parameters in a calibration of the camera array that occurs subsequent to the initial calibration.

7. The method of claim 1 in which the selected subset of parameters comprise an affine transformation.

8. The method of claim 1 in which the selected subset of parameters are independent and relate to one of uniform shift of a captured image along an X axis of a camera, a uniform shift of a captured image along a Y axis of a camera, a uniform stretch of a captured image along an X axis of a camera, or a uniform stretch of a captured image along a Y axis of a camera.

9. The method of claim 8 in which one of the uniform shifts is related to camera pointing error and one of the uniform stretches is related to changing camera focal length.

10. The method of claim 1 in which the specified physical characteristic is one of camera lens focal length, camera lens distortion, or center of optical distortion in a camera system comprising a lens and an image sensor.

11. A method for generating a pre-calibrated registration correction, the method comprising the steps of:
    applying a mapping function to register features among images captured by respective cameras among a set of cameras, the mapping function being expressed, at least in part, using a set of parameters;
    providing an initial calibration to the set of cameras using a subset of the set of parameters;
    warming up the set of cameras from an ambient temperature to a nominal operating temperature;
    determining registration errors at each of a plurality of times as the set of cameras warms up; and
    performing sensitivity analyses to identify parameters in the set of parameters contributing to the registration errors at each of the plurality of times.

12. The method of claim 11 further including a step of recording the registration error per parameter at each of a plurality of temperatures.

13. The method of claim 12 further including a step of generating the pre-calibrated registration correction using the results of the recording.

14. The method of claim 11 further including a step of applying the pre-calibrated registration correction to a second camera set during or after warm-up so that the second camera set is returned to its original factory calibration responsively to its current operating temperature.

15. A computing platform, comprising:
    at least one processor; and
    one or more computer-readable storage media storing instructions which, when executed by the at least one processor, perform a method comprising the steps of
    matching patterns of real world features among images captured by cameras in an array, the images being contained in a single frame or a series of frames over a time window,
    for each matching pattern, normalizing an image parallax relative to a depth plane defined at an initial calibration of a camera in the array,
    recalibrating one or more of the cameras in the array, the recalibrating being performed by adjusting a selected subset of parameters using matching patterns, the parameters being utilized in a mapping function for registering real world features among images captured by the camera array.

16. The computing platform of claim 15 in which the initial calibration defines the set of parameters, the parameters including one or more polynomial coefficients.

17. The computing platform of claim 15 in which the method further includes a step of performing the recalibration responsively to measured temperature of one or more points associated with the array or the computing platform.

* * * * *